US006662108B2

(12) United States Patent
Miller et al.

(10) Patent No.: US 6,662,108 B2
(45) Date of Patent: Dec. 9, 2003

(54) METHOD AND APPARATUS FOR IMPROVING A VEHICLE SAFETY SYSTEM USING A TRANSPONDER AND GPS

(75) Inventors: Ronald Hugh Miller, Saline, MI (US); Perry Robinson MacNeille, Lathrup Village, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 10 days.

(21) Appl. No.: 09/683,483

(22) Filed: Jan. 7, 2002

(65) Prior Publication Data

US 2003/0130794 A1 Jul. 10, 2003

(51) Int. Cl.[7] ................................................ G01C 21/26

(52) U.S. Cl. ......................... 701/301; 701/45; 701/207; 701/213; 701/214; 701/215; 340/903; 340/435; 340/436; 342/357.06; 342/357.12; 342/357.15

(58) Field of Search .......................... 701/45, 207, 213, 701/301, 214, 215; 340/903, 435, 436; 342/357.06, 357.12, 357.17, 357.15

(56) References Cited

U.S. PATENT DOCUMENTS 5,450,329 A * 9/1995 Tanner ....................... 701/213
5,907,293 A * 5/1999 Tognazzini ................. 340/903
5,983,161 A * 11/1999 Lemelson et al. .......... 701/301
6,014,608 A * 1/2000 Seo ............................ 701/207
6,275,773 B1 * 8/2001 Lemelson et al. .......... 701/301
6,405,132 B1 * 6/2002 Breed et al. ................ 701/301
6,487,500 B2 * 11/2002 Lemelson et al. .......... 701/301

FOREIGN PATENT DOCUMENTS

DE 4434789 A1 * 4/1996 ............ G05D/1/02

* cited by examiner

*Primary Examiner*—Michael J. Zanelli
*Assistant Examiner*—Eric M Gibson
(74) *Attorney, Agent, or Firm*—Artz & Artz; Frank A. MacKenzie

(57) ABSTRACT

The present invention provides a method for operating a pre-crash sensing system for a first vehicle having a global positioning system (GPS). The method includes receiving an acquired GPS satellite identifier and generating first vehicle location data with the GPS system. The first vehicle location is transmitted along with the satellite identifier to a second vehicle across a wireless vehicle network. Location information is also received for a detected second vehicle. In response, the first vehicle transmits a request for updated second vehicle location information using a coordinating satellite identifier. The coordinating satellite identifier is then used by the second vehicle to update the second vehicle location data. In this way, both communicating vehicles are generating and sharing location information from a commonly acquired GPS source.

17 Claims, 4 Drawing Sheets

METHOD AND APPARATUS FOR IMPROVING A VEHICLE SAFETY SYSTEM USING A TRANSPONDER AND GPS

BACKGROUND OF INVENTION

The present invention relates to pre-crash sensing systems for automotive vehicles, and more particularly, to a method and apparatus for improving a vehicle safety system using a transponder and GPS.

Auto manufacturers are investigating radar, lidar, and vision-based pre-crash sensing systems to improve occupant safety. Current vehicles typically employ accelerometers that measure forces acting on the vehicle body. In response to accelerometers, airbags or other safety devices are employed. Also, Global Positioning Systems (GPS) systems are used in vehicles as part of navigation systems.

In certain crash situations, it would be desirable to provide information to the vehicle operator before forces actually act upon the vehicle. As mentioned above, known systems employ combinations of radar, lidar and vision systems to detect the presence of an object in front of the vehicle a predetermined time before an actual crash occurs.

Many vehicles are also equipped with GPS for navigation guidance. Typical GPS receivers can communicate with up to twelve satellites. The determination of which satellite or GPS source communicates with a GPS unit is not coordinated between the GPS units in nearby vehicles and depends primarily on the instantaneous signal strength of the satellites in the region of each vehicle equipped with GPS. Reflection, obstruction and atmospheric conditions affect the signal strength at the location of each GPS receiver. Thus, two GPS-equipped vehicles, which may only be a few feet apart, can acquire different satellites from which to determine their respective location data. This can result in differences between the spatial resolution between the two GPS units in the same spatial zone. The resulting error or drift between the two units can be as much as 10 meters. Because of the potential for lack of resolution accuracy between adjacent GPS units, GPS information sharing between vehicles is not practical or useful for safety applications.

It would be desirable to provide a safety system that takes into consideration the GPS information available from other vehicles to provide vehicle environment awareness and threat assessment for crash avoidance and mitigation.

SUMMARY OF INVENTION

The present invention provides an improved vehicle safety system that uses transponders and GPS to share location information among nearby vehicles.

The present invention provides a method for operating a pre-crash sensing system for a first vehicle having a global positioning system (GPS). The method includes receiving an acquired GPS satellite identifier and generating first vehicle location data with the GPS system. The first vehicle location is transmitted along with the satellite identifier to a second vehicle across a wireless vehicle network. Location information is also received for a detected second vehicle. In response, the first vehicle transmits a request for updated second vehicle location information using a coordinating satellite identifier. The coordinating satellite identifier is then used by the second vehicle to update the second vehicle location data. In this way, both communicating vehicles are generating and sharing location information from a commonly acquired GPS source.

One advantage of the invention is that the GPS data can be used to enhance the safety systems of vehicles in addition to providing navigational guidance.

Other aspects and features of the present invention will become apparent when viewed in light of the detailed description of the preferred embodiment when taken in conjunction with the attached drawings and appended claims.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

Figure 1:
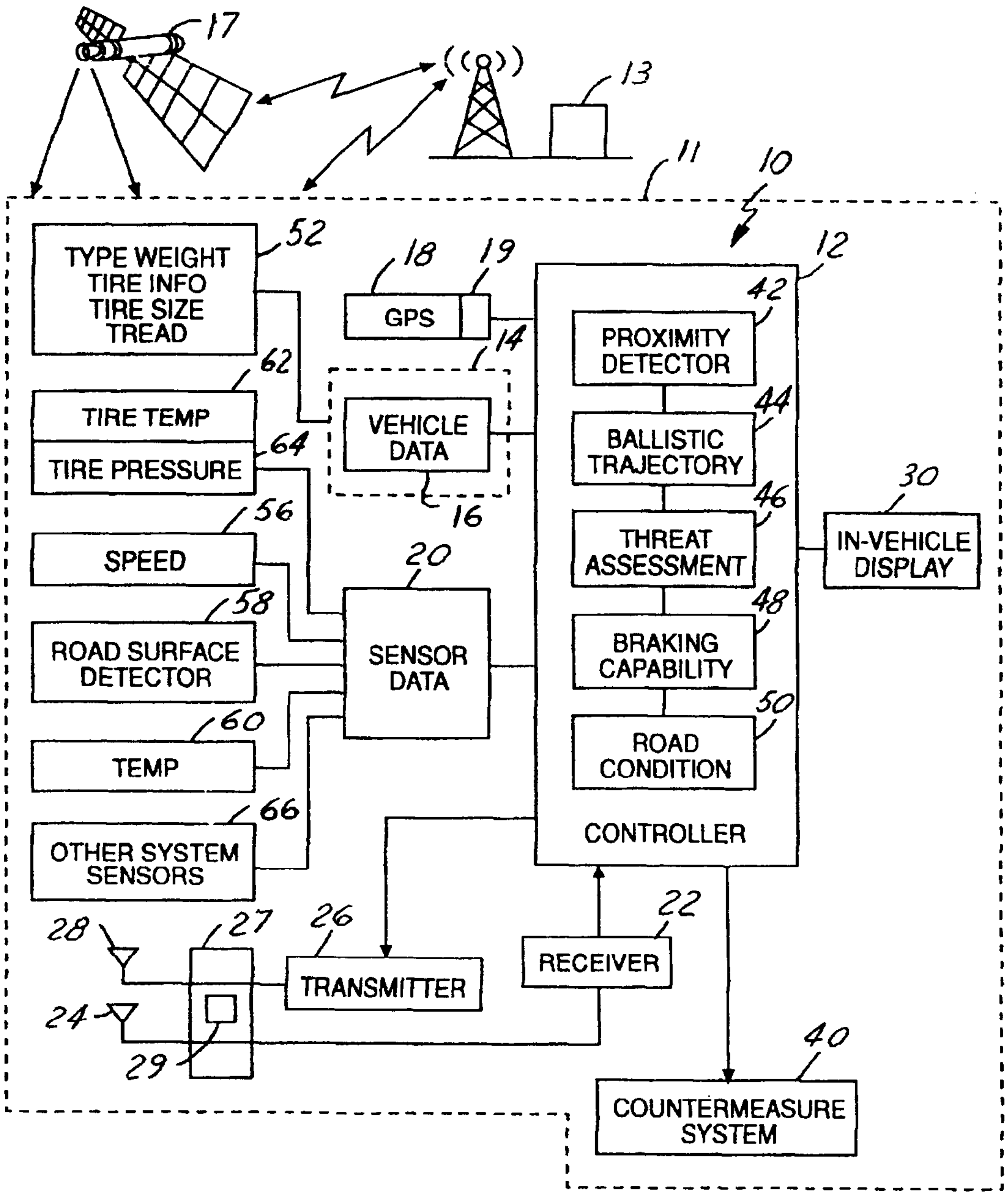
FIG. 1 is a block diagrammatic view of a pre-crash sensing system according to an embodiment of the present invention.

In the following figures, the same reference numerals will be used to identify the same components in the various views.

Referring now to FIG. 1, a pre-crash sensing system 10 for an automotive vehicle 11 has a controller 12. Controller 12 is preferably a microprocessor-based controller that is coupled to a memory 14. Controller 12 has a CPU that is programmed to perform various tasks. Memory 14 is illustrated as a separate component from that of controller 12. However, those skilled in the art will recognize that memory may be incorporated into controller 12.

Memory 14 may comprise various types of memory including read only memory, random access memory, electrically erasable programmable read only memory, and keep alive memory. Memory 14 is used to store various thresholds and parameters including vehicle data 16 as illustrated.

Controller 12 is coupled to a global positioning system (GPS) 18 that receives position data triangulated from satellites 17 or ground stations 13 as is known to those skilled in the art.

Controller 12 is coupled to a sensor data block 20 that represents various sensors located throughout the vehicle. The various sensors will be further described below.

Controller 12 may also be coupled to a receiver 22 coupled to a receiving antenna 24 and a transmitter 26 coupled to a transmitting antenna 28. Transmitter 26 and receiver 22 may be part of a transponder 27. Preferably, vehicle 11 has a transponder located on each of the four sides of the vehicle. That is, a rear transponder is located at the rear of the vehicle, a transponder is located on the left side of the vehicle and, a transponder is located on the right side of the vehicle such that communications can occur with any other vehicles proximate the vehicle 11. A radar sensor 29 is located within each transponder. When a radar signal having a certain amplitude is detected, transmitter 26 generates a response that includes its location relative to the vehicle. Other data such as sensor data, position data, and other data may also be communicated between vehicles by way of the transponder 27.

Controller 12 is also coupled to a display 30 that may include various types of displays including a vehicle network display, a warning display, and a countermeasure display. As should be noted, display 30 may be a single display with different display features or may be individual displays that may include audible warnings as well. Display 30 may be a CRT, LCD, heads-up display or any other known display for communicating information to the vehicle operator.

Controller 12 has various functional blocks illustrated within its CPU. Although these functional blocks may be represented in software, they may also be implemented in hardware. As will be further described below, controller 12 has a proximity detector 42 that is used to determine the proximity of the various vehicles around automotive vehicle 11. A vehicle trajectory block 44 is used to determine the trajectory of the vehicle and surrounding vehicles. Based upon the vehicle trajectory block 44, a threat assessment is made in functional block 46. Of course, threat assessment 46 takes into consideration various vehicle data 16 and sensor data from sensor block 20. Threat assessment 46 may be made based upon the braking capability of the present vehicle and surrounding vehicles in block 48 and also road conditions of the present vehicle and surrounding vehicles in block 50. As will be further described below, the road conditions of block 50 may be used to determine the braking capability in block 48.

Figure 3:
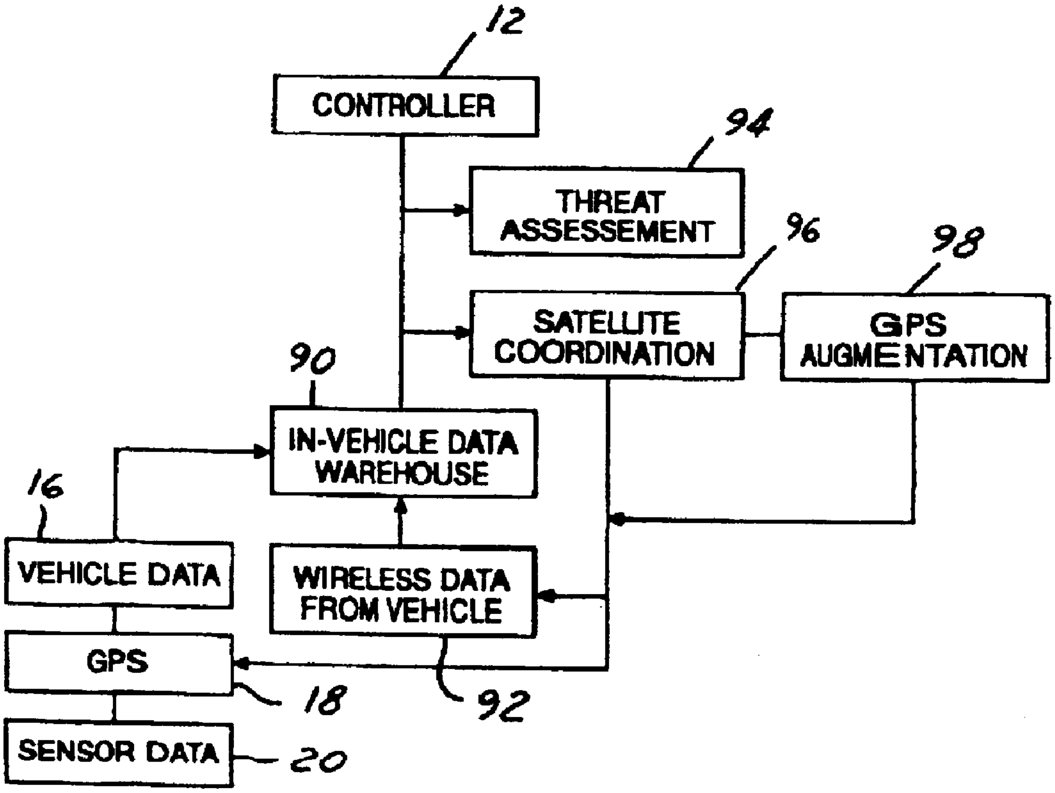
FIG. 3 is a control block diagram of the pre-crash system of FIG. 1.

As described in more detail with regard to FIG. 3, threat assessment block 46 also takes into account GPS data from GPS unit 18 and GPS data from other vehicles via transponder 27.

In block 16, various vehicle data are stored within the memory. Vehicle data represents data that does not change rapidly during operation and thus can be fixed into memory. Various information may change only infrequently and thus may also be fixed into memory 14. Vehicle information includes but is not limited to the vehicle type, which may be determined from the vehicle identification number, the weight of the vehicle and various types of tire information. Tire information may include the tire size and type of tread. Such data may be loaded initially during vehicle build and may then manually be updated by a service technician should information such as the tire information change.

Global positioning system (GPS) 18 generates a position signal for the vehicle 11. Global positioning system 18 updates its position at a predetermined interval. Typical interval update periods may, for example, be one second. Although this interval may seem long compared to a crash event, the vehicle position may be determined based upon the last update from the GPS, and velocity and acceleration information measured within the vehicle.

Data received from GPS system 18 includes latitude and longitude data. By the present invention, satellites 17 are also configured to transmit a satellite identifier value so that the controller can determine the source of the navigational data. Using these satellite identifiers, the safety system software receives similar satellite identifiers from adjacent vehicles, determines the optimum satellite configuration, and requests that all communicating vehicles on the vehicle network acquire the same satellites identified by a coordinating source identifier. Similarly, if GPS signals are received by a ground station 13, a source identifier is also transmitted and all communicating vehicles acquire positioning data from the same source.

Global positioning system 18 has a clock that is common to all GPS systems. Clock 19 provides a timing signal. Each of the GPS systems for different vehicles uses the same clock and timing signal. As will be described below, the common clock for timing signal is used to synchronize the communication between the various vehicles of the system.

Sensor data 20 may be coupled to various sensors used in various systems within vehicle 11. Sensor data 20 may include a speed sensor 56 that determines the speed of the vehicle. Speed sensor may for example be a speed sensor used in an anti-lock brake system. Such sensors are typically comprised of a toothed wheel from which the speed of each wheel can be determined. The speed of each wheel is then averaged to determine the vehicle speed. Of course, those skilled in the art will recognize that the vehicle acceleration can be determined directly from the change in speed of the vehicle. A road surface detector 58 may also be used as part of sensor data 20. Road surface detector 58 may be a millimeter radar that is used to measure the road condition. Road surface detector 58 may also be a detector that uses information from an anti-lock brake system or control system. For example, slight accelerations of the wheel due to slippage may be used to determine the road condition. For example, road conditions such as black ice, snow, slippery or wet surfaces may be determined. By averaging microaccelerations of each tire combined with information such as exterior temperature through temperature sensor 60, slippage can be determined and therefore the road conditions may be inferred therefrom. Such information may be displayed to the driver of the vehicle. The surface conditions may also be transmitted to other vehicles.

Vehicle data 16 has a block 52 coupled thereto representing the information stored therein. Examples of vehicle data include the type, weight, tire information, tire size and tread. Of course, other information may be stored therein.

Sensor data 20 may also include a tire temperature sensor 62 and a tire pressure sensor 64. The road condition and the braking capability of the vehicle may be determined therefrom.

Other system sensors 66 may generate sensor data 20 including steering wheel angle sensor, lateral acceleration sensor, longitudinal acceleration sensor, gyroscopic sensors and other types of sensors.

Figure 2:
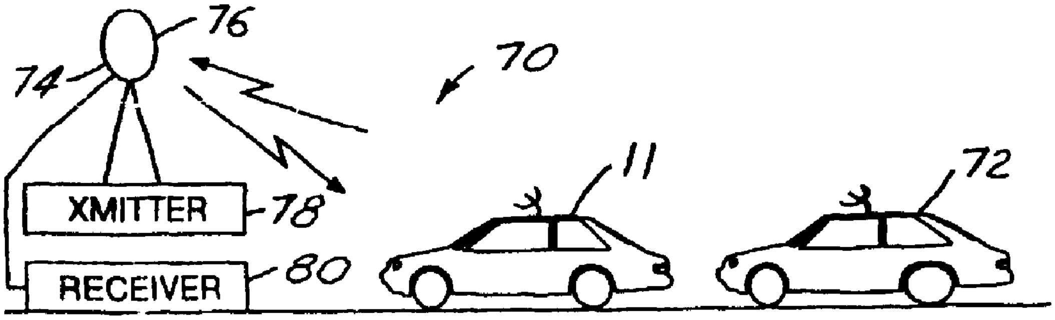
FIG. 2 is a block diagrammatic view of one embodiment of the invention illustrating a vehicle network established by two vehicles.

Referring now to FIG. 2, vehicle 11 is part of a network 70 in conjunction with a second vehicle or various numbers of vehicles represented by reference numeral 72. Vehicle 72 preferably is configured in a similar manner to that of vehicle 11 shown in FIG. 1. Vehicle 72 may communicate directly with vehicle 11 through transmitter 26 and receiver 22 to form a wireless local area network. The network 70 may also include a repeater 74 through which vehicle 11 and vehicle 72 may communicate. Repeater 74 has an antenna 76 coupled to a transmitter 78 and a receiver 80. Various information can be communicated through network 70. For example, vehicle data, position data, and sensor data may all be transmitted to other vehicles throughout network 70.

GPS data is shared between vehicles on the network to augment safety-related data gathered by in-vehicle sensors. The GPS data shared includes each vehicle position data as well as the source (satellite or ground station) identifier. In this way, each vehicle GPS unit can acquire signals from the same source or sources to minimize the position data error by ensuring that the position resolution data used by all vehicle GPS units is the same.

Referring now to FIG. 3 there is shown a control block diagram of the pre-crash system of FIG. 1. As can be seen in FIG. 3, the controller 12 is in operative communication with the vehicle data 16, GPS system 18, and on-vehicle sensor data 20 by way of a communications bus or memory unit such as the in-vehicle data warehouse 90. The data warehouse 90 also stores wireless data from other vehicles indicated in block 92. Using all of this available data stored in data warehouse 90, the controller 12 determines the potential for a collision between the vehicle and a detected object and generates a threat assessment 94. For example, the controller 12 receives an object detection signal from the object detection system which may include the sensor data 20, GPS 18, and wireless data from other vehicles 92. The threat assessment 94 is then generated as a function of the information stored in the data warehouse 90 including the vehicle data 16. The controller 12, in response to the environment and current driving situation as determined by the in-vehicle data warehouse values 90, determines whether any countermeasures should be performed. Alternative methods of generating a detected object threat assessment are also contemplated by the present invention. In all cases, however, the threat assessment takes into account GPS data generated by GPS unit 18 and/or GPS information received wirelessly from other vehicles.

To improve the GPS data for the pre-crash safety system, two additional control measures are taken in the form of satellite coordination 96 and GPS augmentation 98. As mentioned above, the satellite coordination control block 96 determines the optimum satellite configuration for the vehicle and the surrounding vehicles and transmits a request that all communicating vehicles acquire similar satellites for their GPS data. By requiring that all similarly situated vehicles acquire the same satellite or satellites for their respective GPS data, resolution errors regarding positioning data can be minimized. Indeed, by the methodology of the present invention, it has been determined that vehicle spatial accuracy can be resolved to within approximately less than 1 meter depending upon the location of the GPS receiver with respect to the ground plane. This compares favorably to resolution accuracy of approximately 10 meters which can result when nearby receivers acquire different satellites for their respective GPS data. Once the satellite coordination routine is established by control block 96, it is wirelessly transmitted to all vehicles within the vehicle network in communication with the driven vehicle.

The GPS augmentation control block 98 compliments available GPS data from satellites for a vehicle. For example, when driving in the city with large buildings creating interference or obstacles to satellite GPS signals, the GPS signals received and processed are typically limited to those directly overhead of the vehicle. Consequently, the in-vehicle GPS system has very good accuracy in the direction of the vehicle path, but little orthogonal resolution. When such vehicles approach an intersection, access to satellite signals in both the parallel and orthogonal directions typically become available. As such time, the vehicle GPS system can resolve the vehicle location. Vehicle location is then merged with a navigational map and transmitted to all other vehicles in the area so that all of the other vehicles within the network can update their location information using this transmitted mapping data. The GPS augmentation control block 98 is responsible for creating the augmented GPS data for the respective vehicle and receiving such data from the vehicles from within the network. As a result, inaccuracy due to limited line-of-sight to GPS satellites can be eliminated and the spatial resolution of the vehicle GPS unit enhanced by augmentation with the position information. The GPS augmentation is enabled through the use of the vehicle transponders. Again, spatial accuracy can be resolved to within less than approximately 1 meter depending upon the location of the GPS receiver with respect to the ground plane by use of such augmented GPS data.

Figure 4:
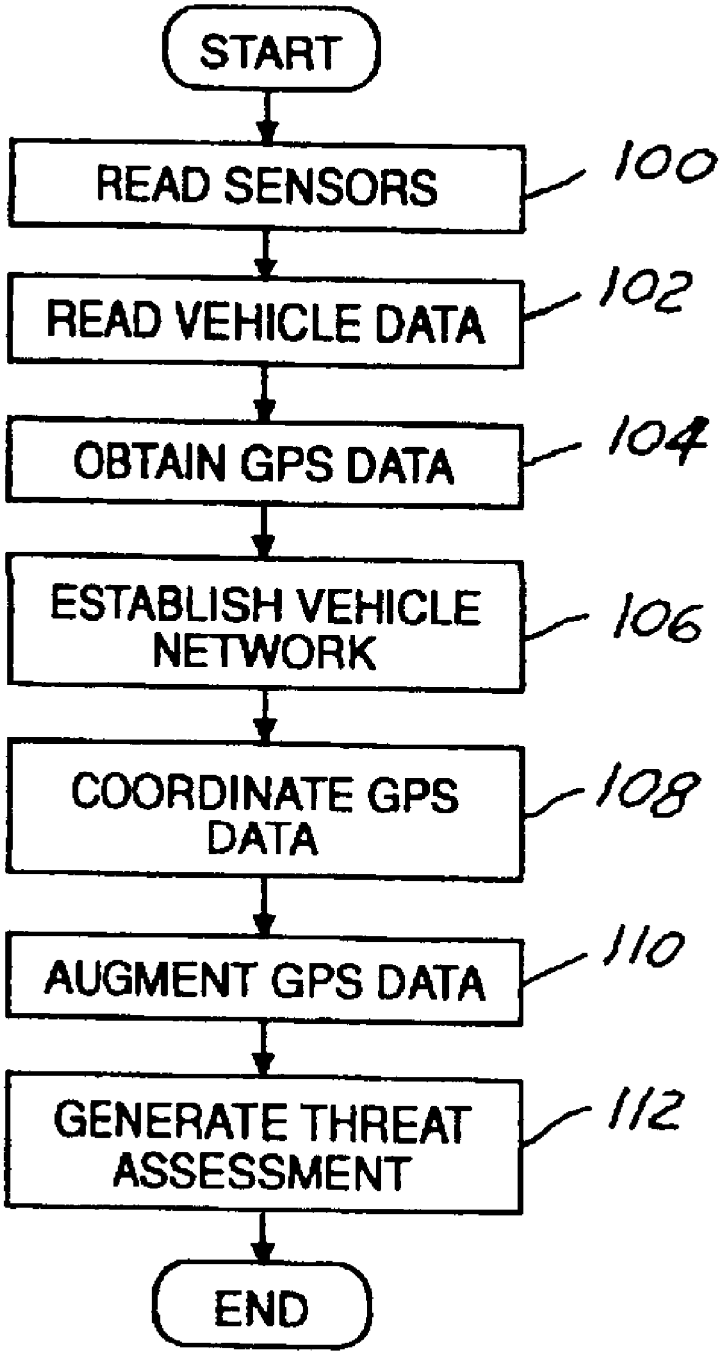
FIG. 4 is a logic flow diagram of one method of operating a pre-crash sensing system according to the present invention.

Referring now to FIG. 4 there is shown a logic flow diagram of one method of operator pre-crash sensing system according to the present invention. The method described is relative to the first vehicle and, upon establishing a wide area network, the information from more than one vehicle is considered. In step 100, the various sensors for the system are read, as is the various vehicle data in step 102. In step 104, the global positioning signal is obtained for the vehicle from overhead satellites and/or ground stations within the area of the vehicle. In step 106, the wide area vehicle network is established with other vehicles proximate the vehicle under consideration. As part of establishing the vehicle network, information from other vehicles within the network such as vehicle speed heading, vehicle type, position, and road conditions as determined by the other vehicles are transmitted and received by the first vehicle. Likewise, the first vehicle transmits its sensor and vehicle data as well as GPS data to the other vehicles within the network. Once the vehicle network is established in step 108, the GPS data of all of the vehicles is coordinated as described above to improve the resolution accuracy of the vehicle position as determined by the vehicle GPS unit. This includes generating and transmitting a coordinating satellite identifier for all GPS units to acquire for updating GPS location data for each vehicle. To the extent necessary, the GPS data is also augmented in step 110 as described above. Based upon the in-vehicle data warehouse containing the vehicle data, sensor data and GPS data, and the wireless data received from other vehicles by way of the vehicle network, the controller generates a threat assessment in step 112. The threat assessment is an indication of, for example, the likelihood that the first vehicle may collide with a detected vehicle or object. The threat is preferably scaled to provide various types of warning to the vehicle operator. The threat assessment may be made based upon conditions of the vehicle trajectory and vehicle type as well as based upon tire information which may provide an indication as to the braking capability of the first vehicle and/or the second vehicle. Thus, the threat level may be adjusted accordingly. As part of generating the threat assessment, the road surface condition may also be factored into the determination. On clear, dry roads, a threat may not be as imminent as if the vehicle is operating under the same conditions on wet or snowy roads. The in-vehicle operator display can be modified as a function of the threat assessment to provide an appropriate warning to the vehicle operator. For generally low threat situations, a simple audible or visual warning may alert the vehicle operator to the presence of a nearby vehicle or object. In the event the threat is more imminent, passive or active countermeasures may be employed to reduce the likelihood of a vehicle crash. Steps 106 through 112 are preferably activated only upon the detection of another vehicle or object, and are updated at a predetermined refresh rate or as a function of the immediacy of the threat. Thus, the greater the likelihood of an impending impact, the greater the priority or processing rate for a particular sensor subset related to tracking the detected object or deploying the desired countermeasures.

From the foregoing, it can be seen that there has been brought to the art a new and improved wireless methodology for enhancing GPS spatial accuracy using transponders. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A method for operating a pre-crash sensing system for a first vehicle having a global positioning system (GPS), the method comprising:

receiving an acquired GPS satellite identifier;

generating first vehicle location data with said GPS;

transmitting said first vehicle location data and said satellite identifier to a second vehicle across a wireless vehicle network;

receiving second vehicle location data from said second vehicle; and generating a coordinating satellite identifier for said second vehicle to acquire for updating said second vehicle location data.

2. A method according to claim 1 wherein said second vehicle location data includes a second satellite identifier.

3. A method according to claim 1 further comprising transmitting said coordinating satellite identifier to said second vehicle across said vehicle network; and using said coordinating satellite identifier to update said first and second vehicle location data.

4. A method according to claim 3 further comprising transmitting said updated first vehicle location to said second vehicle across said vehicle network, and receiving updated second vehicle location data from said second vehicle.

5. A method according to claim 4 further comprising generating a crash threat assessment as a function of said updated first and second vehicle location data.

6. A method according to claim 4 further comprising, in response to receiving said updated second vehicle location data, generating augmented first vehicle location data as a function of said updated second vehicle location data.

7. A method according to claim 1 further comprising, in response to receiving said second vehicle location data, generating augmented first vehicle location data as a function of said second vehicle location data.

8. A method of communicating between a first vehicle and a second vehicle wherein each vehicle includes a GPS unit, the method comprising:

generating first vehicle location data with said first vehicle GPS;

transmitting a coordinating source identifier to said second vehicle across a wireless vehicle network;

generating second vehicle location data with said second vehicle GPS using data received from a GPS source corresponding to said coordinating source identifier; and receiving at said first vehicle said second vehicle location data.

9. A method according to claim 8 further comprising generating at said first vehicle a crash threat assessment as a function of said second vehicle location data.

10. A method according to claim 8 further comprising transmitting said first vehicle location data to said second vehicle.

11. A method according to claim 8 wherein a plurality of other vehicles are in communication with said wireless vehicle network and wherein the method further comprises transmitting said coordinating source identifier to said plurality of other vehicles on said wireless vehicle network; and generating vehicle location data at said plurality of other vehicles using data received from a GPS source corresponding to said coordinating source identifier; and receiving at said first vehicle, vehicle location data for said plurality of other vehicles.

12. A method according to claim 8 further comprising, in response to receiving said second vehicle location data, generating augmented first vehicle location data as a function of said second vehicle location data.

13. A communication system for communicating between a first vehicle and a second vehicle comprising:

a first vehicle having a first GPS, a first transponder, and a controller;

a second vehicle having a second GPS and a second transponder, wherein said first and second vehicles are in operative communication across a vehicle network through said first and second transponders and said controller is programmed to generate first vehicle location data with said first GPS, transmit a coordinating source identifier to said second vehicle across said vehicle network, and receive second vehicle location data generated by said second GPS using data received from a GPS source corresponding to said coordinating source identifier.

14. A communication system according to claim 13 wherein said first vehicle further comprises an object detection system for generating an object detection signal and said controller is programmed to generate a crash treat assessment as a function of said second vehicle location data and said object detection signal.

15. A communication system according to claim 13 wherein said controller is adapted to receive second vehicle data wirelessly from said second vehicle to generate a crash threat assessment as a function of said second vehicle data.

16. A communication system according to claim 13 wherein said source identifier is an acquired satellite identifier.

17. A communication system according to claim 13 wherein said first vehicle further comprises a data storage device in operative communication with said controller, said data storage device for storing vehicle data, GPS data and object detection sensor data.

* * * * *